United States Patent [19]
Knight

[11] Patent Number: 5,182,831
[45] Date of Patent: Feb. 2, 1993

[54] WINDSCREEN WIPER BLADE ARRANGEMENT WITH ORIENTATION INDICATING MEANS

[75] Inventor: Stephen D. Knight, Hillingdon, United Kingdom

[73] Assignee: Trico Products Corporation, Buffalo, N.Y.

[21] Appl. No.: 819,745

[22] Filed: Jan. 13, 1992

[30] Foreign Application Priority Data

Jan. 17, 1991 [GB] United Kingdom ............... 9101039

[51] Int. Cl.$^5$ .......................... B60S 1/04; B60S 1/40
[52] U.S. Cl. ........................ 15/250.42; 15/250.001; 15/250.32; 29/407
[58] Field of Search .......... 15/250 R, 250.32, 250.31, 15/250.35, 250.42, 250.41; 29/407

[56] References Cited

U.S. PATENT DOCUMENTS

| | | |
|---|---|---|
| 3,837,033 | 9/1974 | van den Berg et al. ......... 15/250.32 |
| 4,120,069 | 10/1978 | Sharp et al. ..................... 15/250.32 |
| 4,878,263 | 11/1989 | Raymond ......................... 15/250.32 |
| 5,092,014 | 3/1992 | Charng ............................. 15/250.32 |

FOREIGN PATENT DOCUMENTS

| | | |
|---|---|---|
| 0053960 | 6/1982 | European Pat. Off. . |
| 2337205 | 2/1974 | Fed. Rep. of Germany ... 15/250.42 |
| 2930680 | 2/1981 | Fed. Rep. of Germany . |
| 2181639 | 4/1987 | United Kingdom . |

Primary Examiner—Philip R. Coe
Assistant Examiner—Gary K. Graham
Attorney, Agent, or Firm—Joseph G. Nauman

[57] ABSTRACT

A windscreen wiper blade arrangement comprises a windscreen wiper blade and a connector (11) for connecting the windscreen wiper blade to a windscreen wiper drive arm whereby the blade is driven across a windscreen. The blade is so arranged that the connector (11) is connectable to the windscreen wiper blade in two opposite positions, enabling the blade to be reversed so as to be usable for both left-hand and right-hand drive cars. Indicating means (31,33) are provided on the blade for indicating the type of drive of car for which a particular orientation is intended, the location of the indicating means (31,33) being such that the connector (11) obscures the indication (31 or 33) of the indicating means (31,33) relating to the car for which the orientation is not intended while the indication (33 or 31) for the intended car is visible.

2 Claims, 1 Drawing Sheet

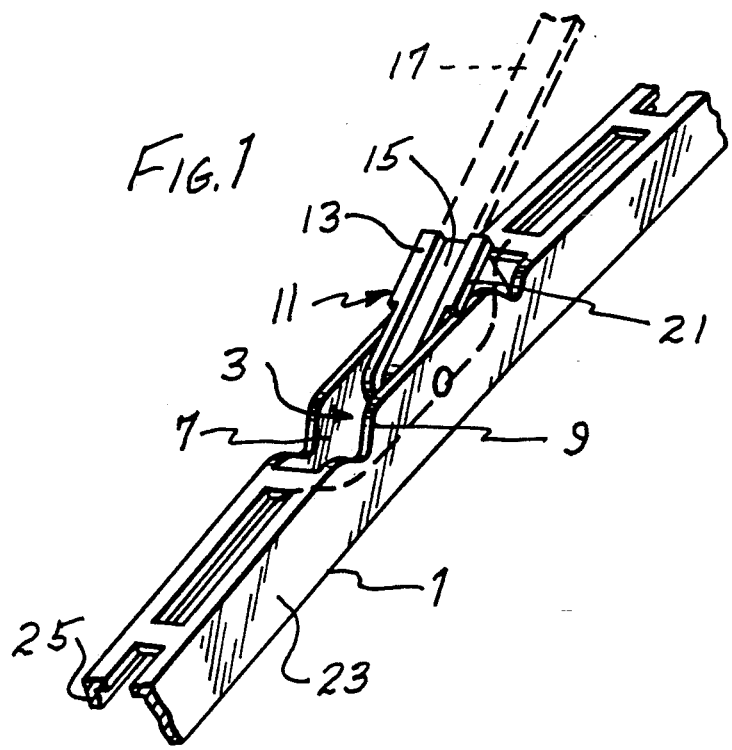
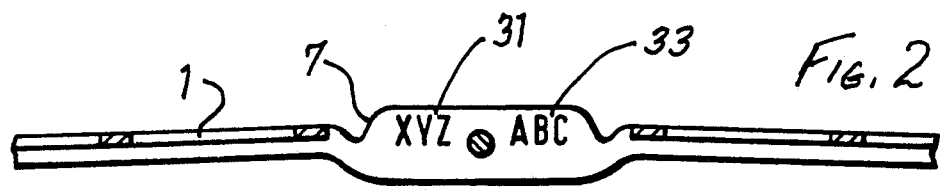
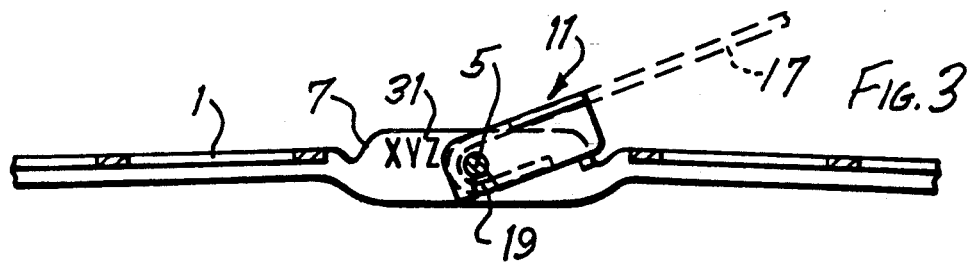
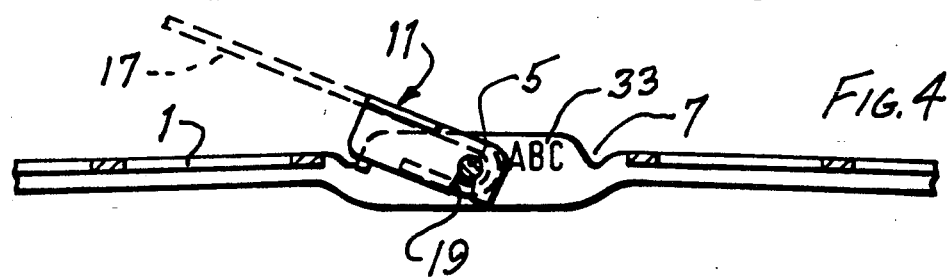

WINDSCREEN WIPER BLADE ARRANGEMENT WITH ORIENTATION INDICATING MEANS

BACKGROUND OF THE INVENTION

This invention relates to a windscreen wiper blade arrangement.

While the specification refers throughout to "cars", it is to be understood that this term is intended to include all vehicles using handed driving arrangements and therefore includes, amongst others, vans, lorries, buses and coaches.

With the advent of specialised windscreen wiper blades dedicated to provide an adequate wipe in conditions in which wind lift of the blades can occur, it has been found necessary to design windscreen wiper blades which are asymmetrical about their longitudinal axis. With these types of blade, orientation is of the essence since, to reduce the effect of wind lift, it is essential for a particular side of the blade to effectively face into the air ("wind") moving over the car. Should the wrong side of the blade face into the wind, not only is the advantage of the specially shaped blades lost but the ability of the wind to lift the blade from the surface of the windscreen can actually be increased.

Common wiping of the windscreen using a dual blade wiper system provides a pattern of wipe in which the blade moves in an arc from an upright position towards the offside of a vehicle to a horizontal position towards the near side of the vehicle. With this pattern of wipe, it will be clear that the pattern for left-hand drive cars and right-hand drive cars will be exactly opposite.

Tests involving a study of the wind lift characteristics of modern wiper blades has shown that, in general, the air flow is such that the special blades only need to be fitted to the driver's side, the passenger side working adequately with standard blades, but of course, special blades may be fitted to both driver's and passenger's side for aesthetic reasons. This situation applies to both left-hand and right-hand drive cars.

The problem exists that the orientation of the blades on the left-hand and right-hand drive cars requires that the anti-wind lift feature, usually one or more vanes need to face into the airflow and, because of the reverse pattern of wipe, the vanes need to be located on opposite sides of the blade, which side depending on the left or right-hand drive of the car. In the past this has meant the provision of two different blades, one for right-hand drive cars and the other for left-hand drive cars.

SUMMARY OF THE INVENTION

The present invention seeks to provide a windscreen wiper blade arrangement in which the above problem is obviated or substantially reduced.

According to the invention, a windscreen wiper blade arrangement comprises a windscreen wiper blade and a connector for connecting the windscreen wiper blade to a windscreen wiper drive arm whereby the blade is driven across a windscreen, the blade being so arranged that the connector is connectable to the windscreen wiper blade in two opposite positions, enabling the blade to be reversed so as to be usable for both left-hand and right-hand drive cars and indicating means on the blade for indicating the type of drive of car for which a particular orientation is intended, the location of the indicating means being such that the connector obscures the indication of the indicating means relating to the car for which the orientation is not intended while the indication for the intended car is visible.

Suitably the indicating means may be in the form of part numbers, one for left-hand drive cars and the other for right-hand drive cars.

Preferably, the windscreen wiper blade is of the type having a plurality of yokes or levers pivoted together and carrying the wiper rubber, the main yoke being provided with a central aperture with side walls, the connector being connectable to the main yoke so as to be locatable towards opposite ends of the aperture for opposite orientation of the blade and covering the inside of the side walls of the aperture towards the associated end, the indication means being in the form of two indications, located on the inside of the side walls, each located at opposite ends thereof.

The aperture may be provided with a transverse pivot pin located between the side walls of the aperture and to which one end of the connector is pivoted such that the majority of the connector lies to one side of the pivot pin.

The connector may suitably be provided with means preventing its rotation over more than a restricted angle so as to prevent the connector, once assembled to the blade, from rotating from one orientation position to the other.

The connector may, if desired, be permanently attached to the blade but is preferably arranged to clip onto the blade so that it may be positioned for the required orientation by the end user.

BRIEF DESCRIPTION OF THE DRAWINGS

The invention will now be described in greater detail, by way of example, with reference to the drawings, in which:

FIG. 1 is a perspective view of a part of the main yoke together with a connector suitable for use in the present invention;

FIG. 2 is a longitudinal sectional view through the part of the main yoke of FIG. 1 showing the location of indicating means in accordance with one form of the invention;

FIG. 3 is a view similar to FIG. 2 but showing the connector in place for use of the blade in a first orientation, and FIG. 4 is a view similar to FIG. 3 but showing the connector in place for use of the blade in a second orientation.

DETAILED DESCRIPTION OF THE DRAWINGS

Referring firstly to FIG. 1, there is shown a central part of the main yoke 1 of a windscreen wiper blade of the kind in which the blade comprises a main and subsidiary yokes pivoted together, a blade rubber being carried by claw structures located at their free ends. As is usual with such blade constructions, an aperture 3 is located centrally of the main yoke 1 and a transverse pivot pin 5 is located centrally in the aperture 3 and extends between side walls 7 and 9 of the aperture 3.

Located on this pivot pin is a connector 11. The connector 11 shown is of the type described and claimed in U.K. Patent No. 2181639 and comprises a connector body 13 having a guide channel 15 for receiving the arm termination of a windscreen wipe arm, indicated in dotted lines at 17. The connector 11 is mounted on the pivot pin 5 by means of a keyhole type snap on aperture 19 (see FIGS. 3 and 4) and has a rib 21 for preventing more than a limited rotation about the pin 5 as explained in greater detail in our said prior patent.

As can be seen, the main yoke 1 is asymmetrical about its longitudinal axis, having a downwardly extending vane structure 23 on one side and a reduced side wall 25 on the other. For the purposes of wind lift suppression, the vane structure 23 must face into the air flow and, as a result, the position of the connector 11 as illustrated makes the blade suitable for left-hand drive cars. This position of the connector is also to be seen from FIG. 3.

If the blade is to be used for a right-hand drive car, it is connected to the pivot pin 5 so as to extend in the opposite direction, as shown in FIG. 4.

From FIG. 2, it will be seen that the side wall 7 of the aperture 3 away from the vane structure 23 is enlarged as compared to the remainder of this side of the main yoke 1 and carries indicating means in the form of two indications 31 and 33, here shown purely for illustration purposes as "XYZ" and "ABC". Indication 31 (XYZ) indicates use for left-hand drive vehicles and indication 33 (ABC) indicates use for right-hand drive vehicles.

Referring now particularly to FIGS. 3 and 4, it will be seen that with the connector in position to orientate the blade for left-hand drive cars (FIG. 3) only the left-hand drive indication 31 (XYZ) is visible but when the connector is in its position to orientate the blade for right-hand drive cars (FIG. 4), only the right-hand drive indication is visible. In this way, the same wiper blade may be used on all cars and the orientation of the blade is immediately apparent by inspection of the indication visible.

While it is possible that the indications 31 and 33 could merely take a form which indicates the orientation, for example "L" or "LHD" or "LEFT" and "R" or "RHD" or "RIGHT" respectively, it may well include or be replaced by a part no., it being usual to specify different part numbers for the different drive cars.

As a result of the invention, it is possible to reduce the holding of different blades by half since the same blade can be used for cars of either hand. Furthermore, manufacture is simpler since a single blade can be manufactured for both part numbers, the part numbers being usually stamped or otherwise formed into the material of the main yoke at an early manufacturing stage as part of one of the forming or blanking stages.

While a specific embodiment of the invention has been described above, it will be appreciated that many modifications or additions may be made to the above described embodiment without departing from the scope of the invention. For example, the indications may be provided on the insides of both side walls of the blade aperture or only on the other side wall.

The connector used may be of any desired type provided that it can be arranged to lie in opposite directions about a pivot so as to obscure one of the indications in either of its two positions. This is helpful particularly where the blade is intended for the replacement or resale markets as such blades are usually supplied with a number of connectors selectable for use with various known arm terminations. For use in the original equipment market, a connector fixed onto the pivot may be used, the orientation of the connector being determined in the factory prior to despatch to customers. Even connectors which do not use pivot pins, being pivoted by various means on one end edge of the aperture can be used if theses are suitably constructed.

I claim:

1. In a windscreen wiper blade arrangement,
   an elongated windscreen wiper blade having front an back sides an including at least a main yoke having a pair of opposed walls extending lengthwise of said main yoke, said walls including interior surfaces defining an aperture between said walls,
   sail wiper blade having a vane structure along said front side adapted to face forward of a vehicle to which said wiper blade is fitted,
   a pivot pin extending between said walls across said aperture,
   a connector body positioned at said walls and cooperating with said pivot pin to provide a pivotable connection between a drive arm and said wiper blade, said connector body being attachable to said pivot pin in either of two orientations whereby said connector body extends away from said aperture in either of two opposite directions along said wiper blade,
   indicia on at least one of said walls and located on opposite sides of said pivot pin,
   said connector body being constructed and arranged to obscure only a first part of said indicia to one side of said pivot pin when in a first orientation on said pivot pin and to obscure only a second part of said indicia when mounted in a second orientation on said pivot pin.

2. A wiper blade arrangement as defined in claim 1, further including
   said connector body being received between said walls,
   said indicia being positioned on one of said interior surfaces of one of said walls and being distributed equally on opposite sides of said pivot pin whereby the indicia on the side of said pivot pin opposite to the direction of extension of said connector body is exposed to view when the wiper blade is assembled to an arm on a vehicle and the remaining indicia is obscured by parts of said connector body.

* * * * *